(12) United States Patent
Furukawa et al.

(10) Patent No.: US 11,635,837 B2
(45) Date of Patent: Apr. 25, 2023

(54) DISPLAY DEVICE FOR TEMPERATURE CORRECTION OF AN INPUT IMAGE SIGNAL ON A TOUCH DISPLAY PANEL

(71) Applicant: SHARP KABUSHIKI KAISHA, Sakai (JP)

(72) Inventors: Hiroyuki Furukawa, Sakai (JP); Chie Toridono, Sakai (JP); Masafumi Ueno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/700,610

(22) Filed: Mar. 22, 2022

(65) Prior Publication Data

US 2022/0317818 A1 Oct. 6, 2022

(30) Foreign Application Priority Data

Mar. 30, 2021 (JP) .............................. JP2021-058429

(51) Int. Cl.
*G06F 3/041* (2006.01)
*G06F 3/044* (2006.01)
*G02F 1/1333* (2006.01)

(52) U.S. Cl.
CPC ........ *G06F 3/0412* (2013.01); *G02F 1/13338* (2013.01); *G06F 3/0418* (2013.01); *G06F 3/0446* (2019.05); *G09G 2320/041* (2013.01)

(58) Field of Classification Search
CPC .... G06F 3/0446; G06F 3/0412; G06F 3/0418; G02F 1/13338; G09G 2320/04; G09G 2320/041; G09G 2320/0666
See application file for complete search history.

(56) References Cited

U.S. PATENT DOCUMENTS

| 6,333,728 B1 * | 12/2001 | Libsch .............. G02F 1/133382 345/87 |
| 9,513,742 B2 * | 12/2016 | Kim ...................... G06F 3/0418 |
| 10,175,819 B2 * | 1/2019 | Kwon .................... G09G 5/003 |
| 10,706,252 B2 * | 7/2020 | Miller ................ G06V 40/1306 |
| 2015/0205436 A1 * | 7/2015 | Iwamoto ................. G06F 3/044 345/174 |
| 2016/0098151 A1 * | 4/2016 | Kim ..................... G06F 3/0412 345/174 |
| 2016/0291792 A1 * | 10/2016 | Sawahata .............. G06F 3/0418 |
| 2017/0242505 A1 * | 8/2017 | Vandermeijden ........ G01K 3/14 |
| 2020/0388225 A1 * | 12/2020 | Kim ..................... G09G 3/3258 |
| 2022/0229504 A1 * | 7/2022 | Withers ................ G06F 3/0393 |

FOREIGN PATENT DOCUMENTS

| JP | 2005-077824 A | 3/2005 |
| JP | 2020-085536 A | 6/2020 |

* cited by examiner

*Primary Examiner* — Darlene M Ritchie
(74) *Attorney, Agent, or Firm* — ScienBiziP, P.C.

(57) ABSTRACT

A display device includes: a temperature distribution obtaining circuit obtaining temperature distribution on a display panel on a basis of a capacitance value signal to be output from a capacitive touch panel overlapping the display panel; and a correcting circuit correcting an input image signal on a basis of the temperature distribution on the display panel, and supplying the input image signal.

7 Claims, 10 Drawing Sheets

DISPLAY DEVICE FOR TEMPERATURE CORRECTION OF AN INPUT IMAGE SIGNAL ON A TOUCH DISPLAY PANEL

CROSS-REFERENCE TO RELATED APPLICATION

The present application claims priority from Japanese Application JP 2021-058429, the content to which is hereby incorporated by reference into this application.

BACKGROUND

The disclosure relates to a display device capable of measuring temperature of a display panel for displaying an image.

TECHNICAL FIELD

A known display device includes either a plurality of resistance temperature detectors formed into films or a plurality of temperature detecting transistors. The detectors or the transistors are attached in a matrix to a back face of a display panel and detecting information as to where heat is generated and what is the temperature of the heat. The display device compares the detected temperature with ambient temperature information to obtain data of a rise in the temperature. (See Japanese Unexamined Patent Application Publication No. 2005-077824.)

Moreover, a known touch detecting apparatus includes two capacitive sensors having different temperature characteristics in relative permittivity and detecting capacitances. The touch detecting apparatus detects variation in the temperature of the two capacitive sensors, using a detected capacitance ratio obtained from the result of the detection by the two capacitive sensors. (See Japanese Unexamined Patent Application Publication No. 2020-085536.)

SUMMARY

Small- and medium-sized organic-light-emitting-diode (OLED) display devices are often provided with a touch panel. A problem of the resistance temperature detectors described in Patent Document 1 is that some of the resistance temperature detectors that have to be separately provided are nothing to do with the display panel and the touch panel. Such resistance temperature detectors are disadvantageous costwise.

Moreover, as to the configuration described in Patent Document 1 citing the temperature detecting transistors, the temperature detecting transistors serving as dummies and not directly related to functions of the display panel have to be each provided to one of the pixels. Furthermore, lead lines have to be laid from the temperature detecting transistors out of the display panel. These problems are causes of a complex production process of, and a decrease in yield of, the display panels, and the problems become a significant factor causing a cost increase.

A problem of Patent Document 2 is that the configuration requires two capacitive sensors having different temperature characteristics in relative permittivity, such that the touch detecting apparatus is complex in configuration.

An aspect of the disclosure is to provide a display device in a simple configuration capable of obtaining temperature distribution on a surface of a display panel.

In order to solve the above problems, a display device according to an aspect of the disclosure includes: a display panel displaying an image; a capacitive touch panel overlapping a surface of the display panel; a temperature distribution obtaining circuit obtaining temperature distribution on the surface of the display panel, on a basis of a capacitance value signal to be output from the touch panel; and a correcting circuit correcting an input image signal corresponding to the image, and supplying the input image signal to the display panel. The input image signal is corrected on a basis of the temperature distribution, on the surface of the display panel, obtained by the temperature distribution obtaining circuit.

An aspect of the disclosure can provide a simple configuration to obtain temperature distribution on a surface of a display panel.

DESCRIPTION OF EMBODIMENTS

First Embodiment

Figure 1:
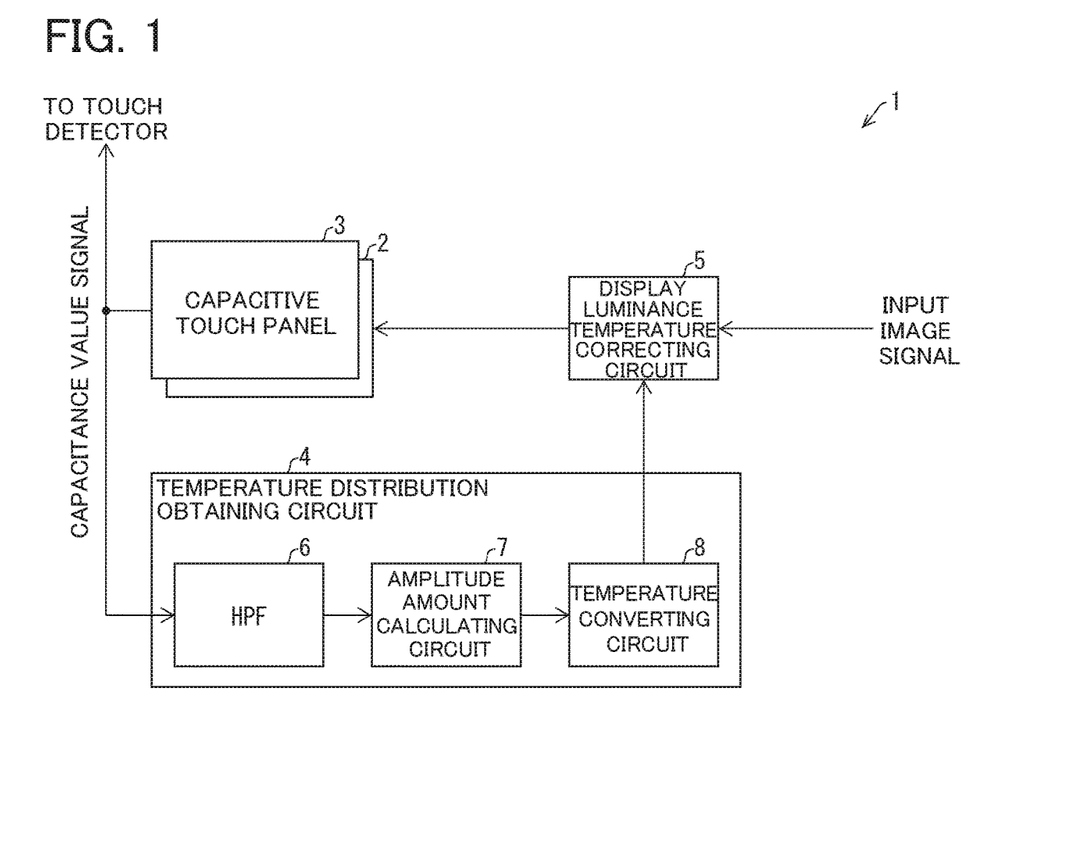
FIG. 1 is a block diagram illustrating a display device according to a first embodiment.
Figure 2:
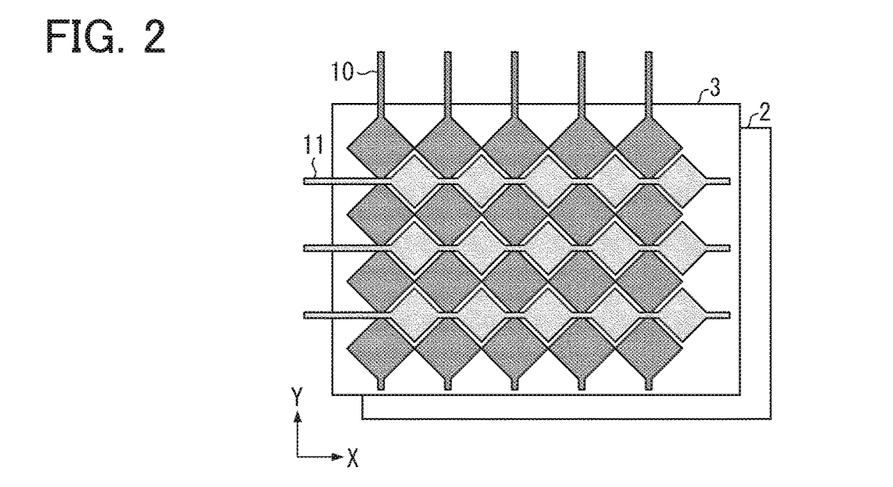
FIG. 2 is a plan view of a display panel and a touch panel provided to the above display device.
Figure 3:
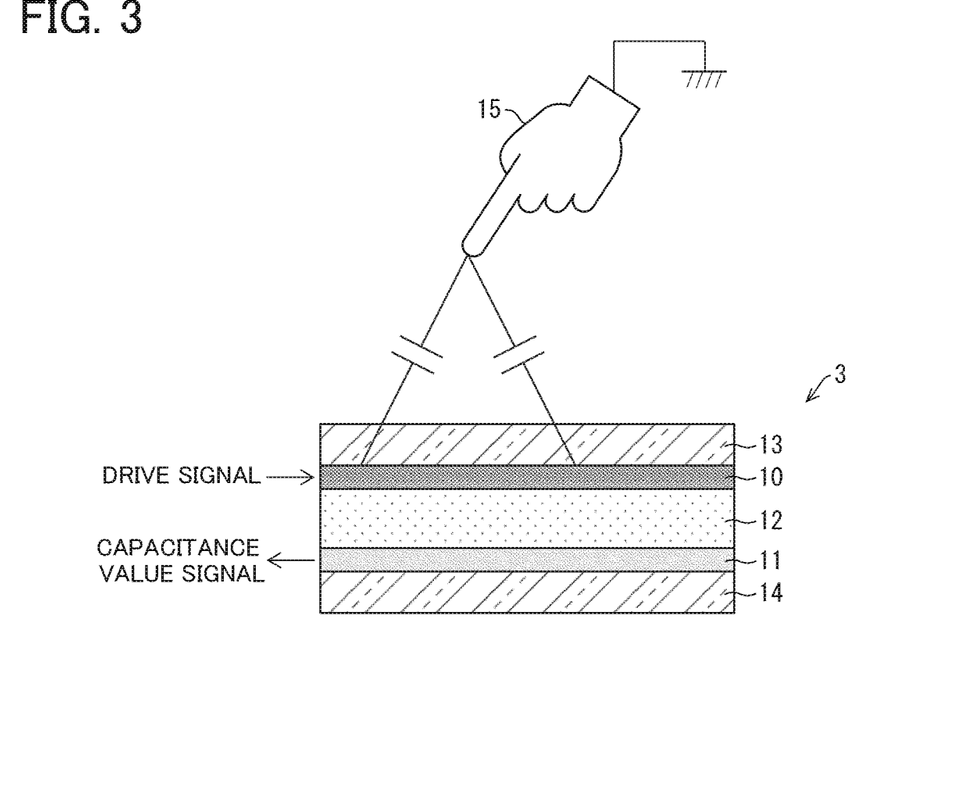
FIG. 3 is a cross-sectional view of the above touch panel.

Described below in detail is an embodiment of the disclosure. FIG. 1 is a block diagram illustrating a display device 1 according to a first embodiment. FIG. 2 is a plan view of a display panel 2 and a touch panel 3 provided to the display device 1. FIG. 3 is a cross-sectional view of the touch panel 3.

The display device 1 includes: the display panel 2 displaying an image; a capacitive touch panel 3 overlapping a surface of the display panel 2; a temperature distribution obtaining circuit 4 obtaining temperature distribution on the surface of the display panel 2, on a basis of a capacitance value signal to be output from the touch panel 3; and a display luminance temperature correcting circuit 5 correcting an input image signal corresponding to the image, and supplying the input image signal to the display panel 2. The input image signal is corrected on a basis of the temperature distribution, on the surface of the display panel 2, obtained by the temperature distribution obtaining circuit 4.

The display panel 2 includes a plurality of light-emitting display elements. The light-emitting display elements may be, for example, OLED display elements. Alternatively, the light-emitting display elements may be either quantum-dot light-emitting-diode (QLED) display elements, or micro light-emitting-diode (μLED) display elements. The same applies to second and third embodiments to be described later.

Note that, in this DESCRIPTION, a display element (including a light-emitting display element and a liquid-crystal display element to be described later) means a unit pixel including: a driving transistor, a control transistor, and a light emitter or a liquid crystal unit.

The display luminance temperature correcting circuit 5 adjusts an amount of a current driving the light-emitting display elements, on a basis of the temperature distribution, on the surface of the display panel 2, obtained by the temperature distribution obtaining circuit 4.

The temperature distribution obtaining circuit 4 obtains the temperature distribution on the surface of the display panel 2, on a basis of a high-frequency component of a capacitance value signal to be output from the touch panel 3.

This temperature distribution obtaining circuit 4 includes: a high-pass filter 6 allowing the high-frequency component of the capacitance value signal to pass through; an amplitude amount calculating circuit 7 calculating an amount of amplitude of the high-frequency component passing through the high-pass filter 6; and a temperature converting circuit 8 converting, to data representing the temperature, the amount of the amplitude of the high-frequency component calculated by the amplitude amount calculating circuit 7.

On a basis of the capacitance value signal to be output from the touch panel 3, a touch on the surface of the display panel 2 is detected.

The touch panel 3 includes: a plurality of X electrodes 10 extending in parallel with one another in the Y direction; and a plurality of Y electrodes 11 extending in parallel with one another in the X direction. An adhesive layer 12 is provided between the X electrodes 10 and the Y electrodes 11. A resin layer 13 is provided across the X electrodes 10 from the adhesive layer 12. A resin layer 14 is provided across the Y electrodes 11 from the adhesive layer 12.

For example, when a drive signal based on a coded sequence is applied to X electrodes 10. Y electrodes 11 output a liner-combination signal based on charges accumulated in intersections of the X electrodes 10 and the Y electrodes 11. Then, a capacitance value signal, which represents a capacitance of each of the intersections of the X electrodes and the Y electrodes 11, is obtained on a basis of the liner-combination signal and the coded sequence. This capacitance value signal is output from the touch panel 3.

The capacitance value signal from the touch panel 3 is updated on a basis of scan speed of the drive signal of the touch panel 3. Hence, the temperature distribution obtaining circuit 4 can obtain the temperature distribution on the surface of the display panel 2 at a rate of 120 Hz or higher.

When a conductive material, such as a finger 15, comes closer to X electrodes 10, capacitive coupling occurs between the finger 15 and the X electrodes 10. Then, a plurality of capacitive coupling values between the X electrodes 10 and Y electrodes 11 simultaneously vary between the X electrodes 10 and the Y electrodes 11 adjacent to one another. These capacitive coupling values vary at intersections of the X electrodes 10 and the Y electrodes 11. The intersections are detected as a position at which the finger 15 touches.

Figure 4:
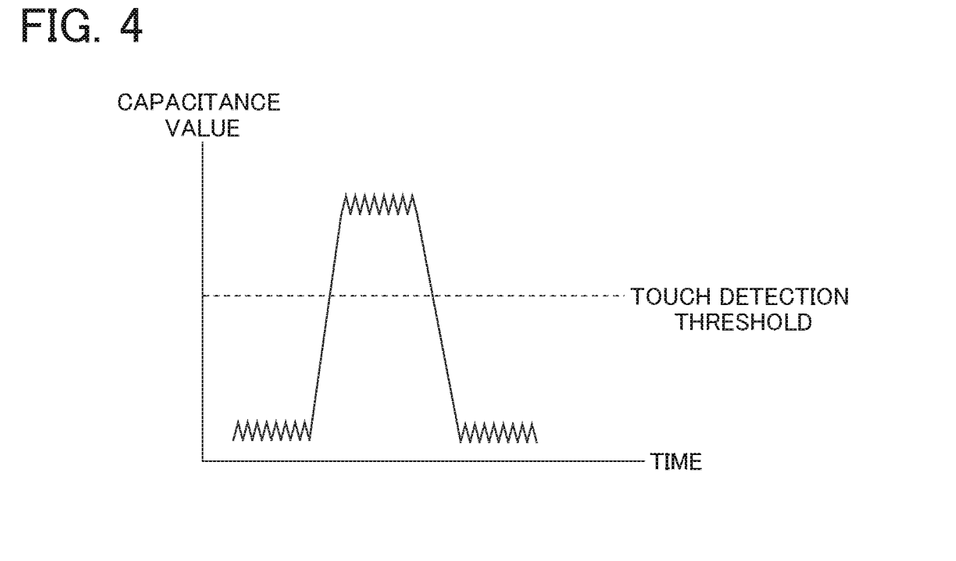
FIG. 4 is a graph showing a capacitance value signal to be output from the above touch panel at low temperature.
Figure 5:
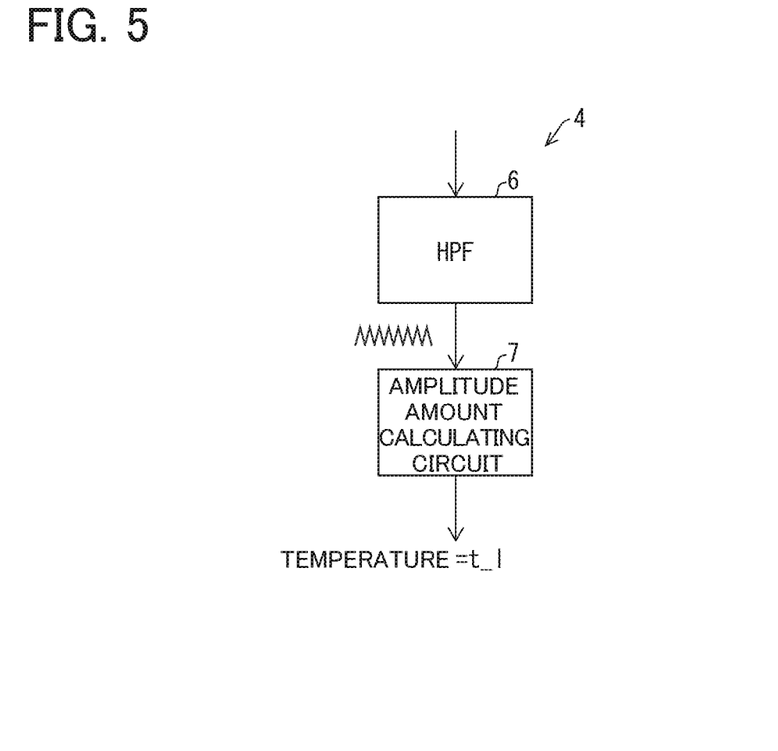
FIG. 5 is a block diagram illustrating how to process the above capacitance value signal, using a temperature distribution obtaining circuit provided to the above display device.
Figure 6:
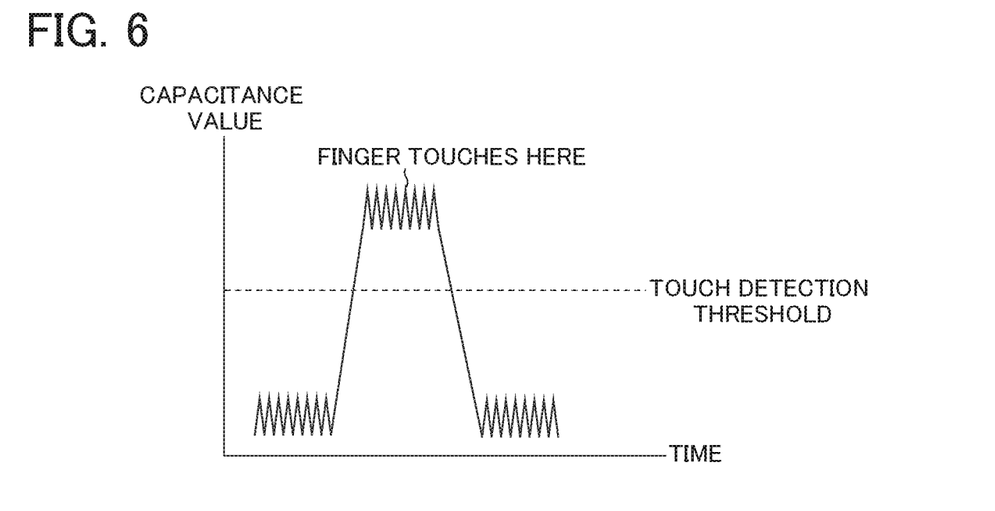
FIG. 6 is a graph showing a capacitance value signal to be output from the above touch panel at high temperature.
Figure 7:
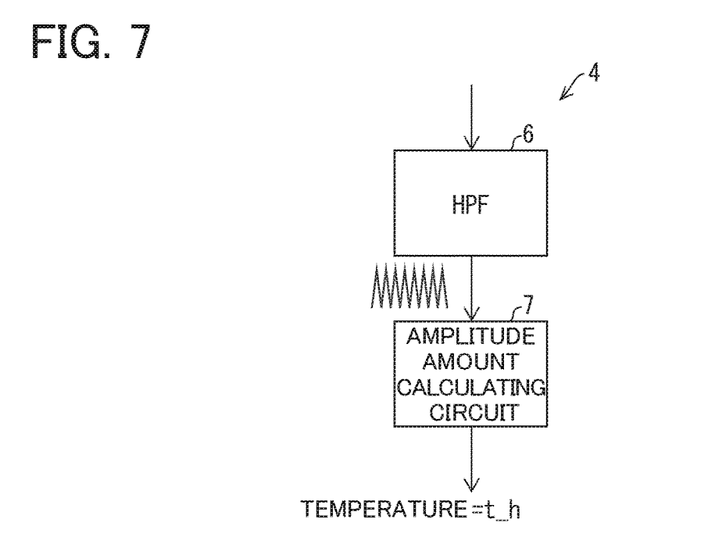
FIG. 7 is a block diagram illustrating how to process the above capacitance value signal, using the above temperature distribution obtaining circuit.
Figure 8:
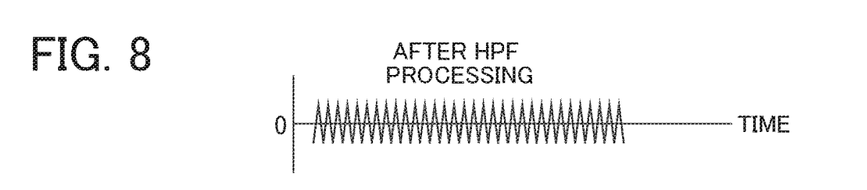
FIG. 8 is a graph showing a high-frequency component of the above capacitance value signal passing through a high-pass filter provided to the temperature distribution obtaining circuit.
Figure 9:
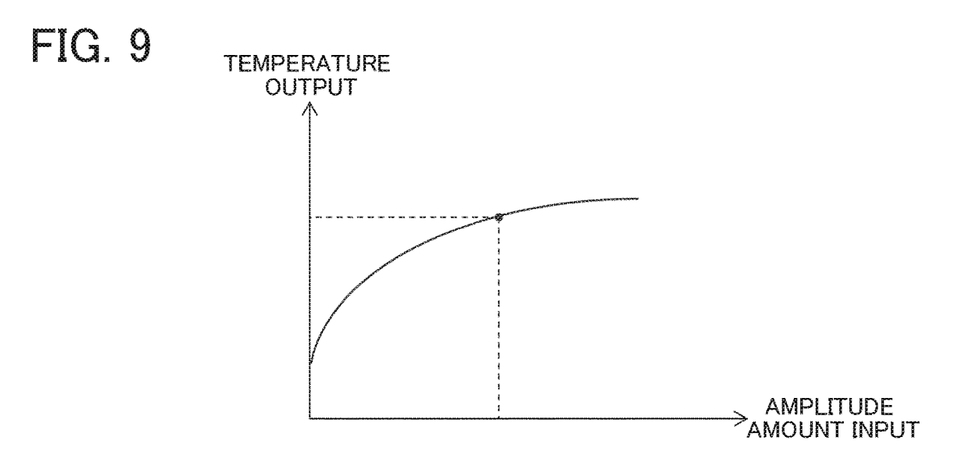
FIG. 9 is a graph showing a relationship between temperature of a surface of a display panel and amount of amplitude of a high-frequency component of a capacitance value signal represented in a look-up table provided to a temperature converting circuit of the above temperature distribution obtaining circuit.

FIG. 4 is a graph showing a capacitance value signal to be output from the touch panel 3 at low temperature. FIG. 5 is a block diagram illustrating how to process the capacitance value signal, using the temperature distribution obtaining circuit 4. FIG. 6 is a graph showing a capacitance value signal to be output from the touch panel 3 at high temperature. FIG. 7 is a block diagram illustrating how to process a capacitance value signal, using the temperature distribution obtaining circuit 4. FIG. 8 is a graph showing a high-frequency component of a capacitance value signal passing through a high-pass filter 6 provided to the temperature distribution obtaining circuit 4. FIG. 9 is a graph showing a relationship between the temperature on the surface of the display panel 2 and the amount of the amplitude of a high-frequency component of a capacitance value signal represented in a look-up table provided to the temperature converting circuit 8 of the temperature distribution obtaining circuit 4.

The adhesive layer 12 is made of such an adhesive as optical clear resin (OCR) and an optical clear adhesive (OCA) sheet. These materials exhibit variation in capacitance with temperature. Hence, as illustrated in FIGS. 4 and 6, a noise component of the detected capacitance value signal increases as the temperature varies from low to high.

That is, in accordance with the distribution of the heat generated within the surface of the display panel 2, the noise component of the capacitance value signal varies. The amplitude of the noise component of the capacitance value signal is small at low temperature and large at high temperature.

This capacitance value signal is transmitted to the high-pass filter 6 of the temperature distribution obtaining circuit 4, separately from transmission to a touch detector for detecting a touch by threshold determination regularly executed. As illustrated in FIGS. 6 and 8, the high-pass filter 6 allows only a high-frequency component of the capacitance value signal to pass through.

Hence, the noise component of the capacitance value signal is the high-frequency component, and can be separated with the high-pass filter 6.

The noise component, of the capacitance value signal, passing through the high-pass filter 6 is converted by the amplitude amount calculating circuit 7 to an amount of amplitude of the noise. A signal having the high-frequency component includes no direct-current component. Hence, an absolute value of the signal input to the amplitude amount calculating circuit 7 is calculated, so that an amount of amplitude of the high-frequency component is obtained. Here, removal of data exceeding a threshold and averaging are executed within a range of a certain time axis or a certain area, so that the amplitude can be obtained in a stable amount.

The amount of the amplitude of the noise calculated by the amplitude amount calculating circuit 7 is converted by the temperature converting circuit 8 to data representing temperature. The temperature converting circuit 8 is readily provided in the form of, for example, a look-up table (LUT) illustrated in FIG. 9. That is, the temperature converting circuit 8 can be provided in the form of such a memory as a read-only memory (ROM) storing table data where data representing an amount of amplitude of noise is input and data representing temperature is output. The relationship between the input data and the output data stored in the memory is previously obtained by, for example, experiments. With this look-up table, a noise component of a capacitance value signal is converted to temperature distribution on the surface of the touch panel 3.

Hence, the distribution of the amount of the amplitude of the high-frequency component within the surface of the touch panel 3 is obtained. Accordingly, the temperature distribution within the surface of the display panel 2 can be estimated. The touch panel 3 generates no heat, and the temperature distribution on the touch panel 3 is exactly the temperature distribution within the surface of the display panel 2.

In accordance with the temperature distribution, within the surface of the display panel 2, obtained by the temperature converting circuit 8, the display luminance temperature correcting circuit 5 corrects an input image signal. On the surface of the display panel 2, a region at a relatively high temperature is likely to allow a current to flow into light-emitting display elements. Hence, if the input image signal is not corrected by the display luminance temperature correcting circuit 5, luminance of emitted light inevitably rises. Hence, the display luminance temperature correcting circuit 5 corrects the input image signal to make the signal small to reduce the current flowing into the light-emitting display elements in the region at a relatively high temperature.

Hence, even if the temperature of the surface of the display panel 2 is not distributed evenly because of the content displayed by the display panel 2, the display panel 2 can display the image at a predetermined luminance.

Note that the temperature distribution on the surface of the display panel 2 is influenced not only by the displayed content but also by drive circuits for the light-emitting display element, such as source drivers, and other heat sources. The capacitive touch panel 3 to be used in this embodiment can obtain the temperature distribution on the surface of the display panel 2 with such influences reflected in the obtained temperature distribution.

As can be seen, the above features make it possible to detect the temperature distribution on the surface of the display panel 2 including the light-emitting display elements serving as a heat source, and to correct the input image signal for an image to be displayed by the display panel. The temperature distribution is detected on a basis of the capacitance value signal from the capacitive touch panel 3. The input image signal is corrected on a basis of the detected temperature distribution. Hence, regardless of the temperature distribution on the surface of the display panel 2, the image can be displayed at a predetermined luminance over the entire surface of the display panel 2.

In this embodiment, the temperature distribution on the surface of the display panel 2 is estimated from noise amplitude of a capacitance value signal from the capacitive touch panel 3. Hence, unlike the display device described in Patent Document 1 and provided with separate resistance temperature detectors or separate temperature detecting transistors for detecting temperature, the display device according to this embodiment requires a minimal increase in costs for detecting temperature.

Moreover, in a widely available known technique, one or more temperature sensors are placed in any given position (e.g. a TCON and a driver substrate) to estimate temperature of the display panel. However, this technique cannot theoretically detect temperature distribution observed inside the surface of the display panel and depending on the content to be displayed.

Second Embodiment

Described below in detail is another embodiment of the disclosure. For the sake of description, like reference signs designate functionally identical components between this embodiment and the above embodiment. Such components will not be elaborated repeatedly.

Figure 10:
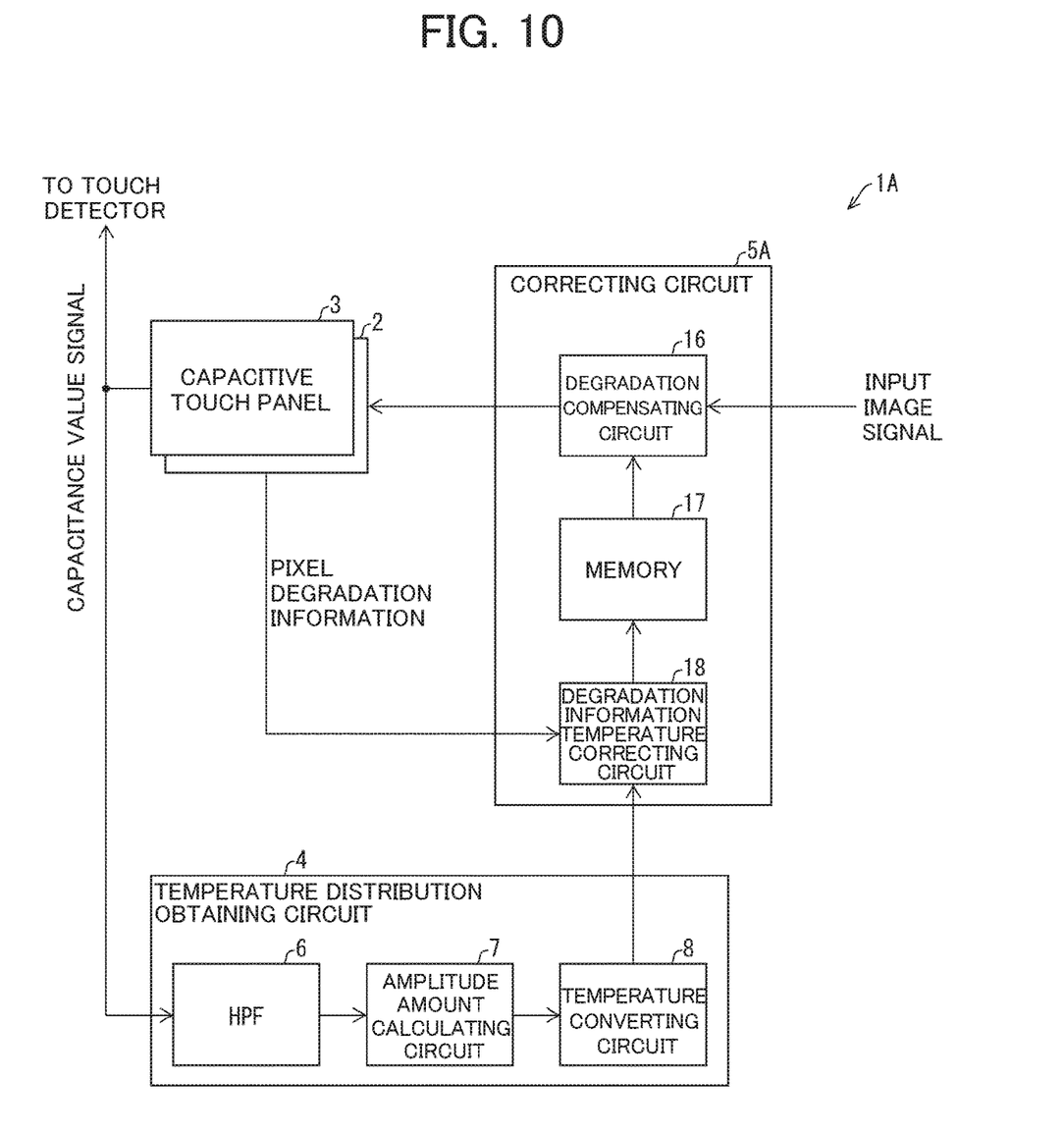
FIG. 10 is a block diagram illustrating a display device according to a second embodiment.
Figure 11:
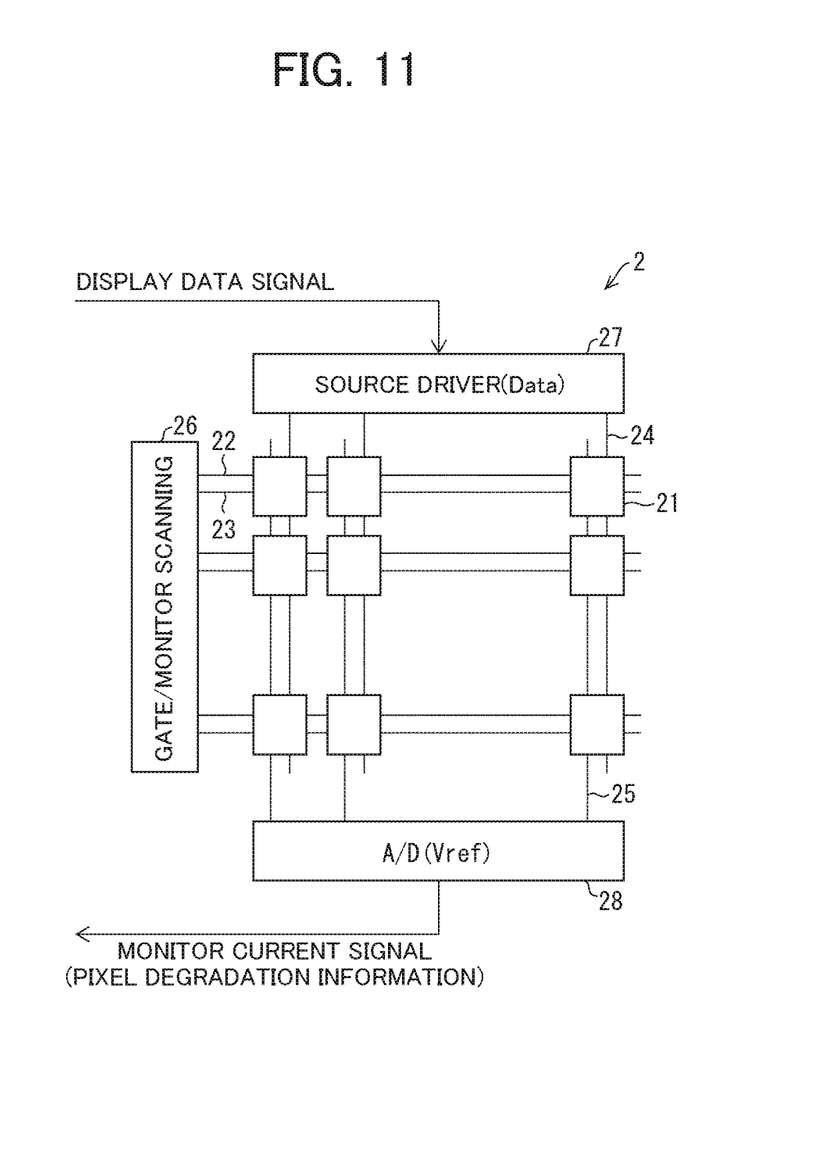
FIG. 11 is a block diagram illustrating a display panel provided to the above display device.
Figure 12:
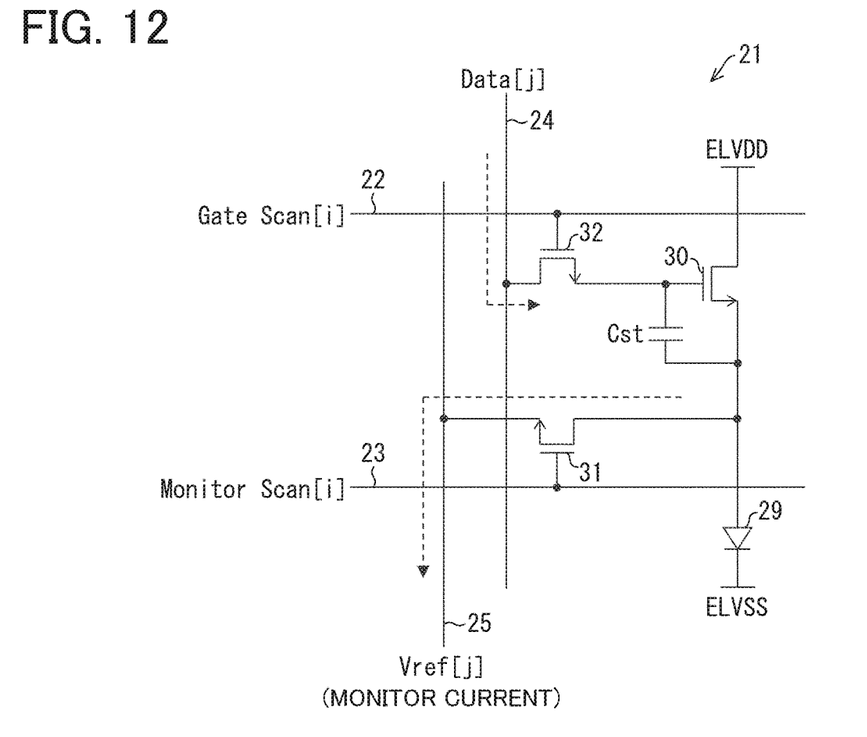
FIG. 12 is a circuit diagram of a light-emitting display element provided to the above display panel.

FIG. 10 is a block diagram illustrating a display device 1A according to a second embodiment. FIG. 11 is a block diagram illustrating the display panel 2 provided to the display device 1A. FIG. 12 is a circuit diagram of a light-emitting display element provided to the display panel 2.

The display device 1A includes: the display panel 2 displaying an image; the capacitive touch panel 3 overlapping the surface of the display panel 2; and the temperature distribution obtaining circuit 4 obtaining temperature distribution on the surface of the display panel 2, on a basis of a capacitance value signal to be output from the touch panel 3.

As illustrated in FIG. 11, the display panel 2 includes a plurality of gate scan lines 22 extending horizontally; a plurality of monitor scan lines 23 extending horizontally; a plurality of data lines 24 extending vertically; a plurality of monitor lines 25 extending vertically; a gate-monitor scan circuit 26 connected to the gate scan lines 22 and the monitor scan lines 23; a source driver 27 connected to the data lines 24; an AD converter 28 connected to the monitor lines 25; and the light-emitting display elements 21 arranged in a matrix and connected to the gate scan lines 22, the monitor scan lines 23, the data lines 24, and the monitor lines 25.

As illustrated in FIG. 12, each of the light-emitting display elements 21 includes: a light emitter 29 displaying the image; a gate transistor 32 receiving display data from the source driver 27 through a data line 24; a drive transistor 30 driving the light emitter 29 on a basis of the display data; and a read-out transistor 31 (a monitor circuit) reading out a drive current to be supplied from the drive transistor 30 to the light emitter 29, in order to monitor at least one of the light emitter 29 or the drive transistor 30.

As can be seen, the light-emitting display element 21 is a unit pixel including the transistors 32, 30, and 31 for driving and controlling, and the light emitter 29.

The display device 1A further includes a correcting circuit 5A. The correcting circuit 5A corrects monitor information on at least one of the light emitter 29 or the drive transistor 30 monitored by the monitor circuit, and adjusts an amount of a current for driving the light-emitting display elements 21. The monitor information is corrected on a basis of the temperature distribution obtained by the temperature distribution obtaining circuit 4. The amount of the current is adjusted on a basis of the corrected monitor information.

In this embodiment, the capacitive touch panel 3 detects temperature distribution on the surface of the display panel 2 including the light-emitting display elements 21 serving as a heat source, and, in accordance with the obtained temperature distribution, separately obtained pixel degradation information is corrected. Such features make it possible to display an image compensated in accordance with pixel degradation without influence of the temperature distribution. The same technique as described in the first embodiment is used to obtain the temperature distribution on the display panel 2 on a basis of a capacitance value signal from the capacitive touch panel 3.

Because of the reason below, temperature correction is required to the pixel degradation information obtained in monitoring a current. That is, in monitoring a current, a monitor voltage is applied to pixels (drive thin-film transistors (TFTs) and OLED elements), and a current flowing at that moment is read outside for each of the pixels.

Figure 13:
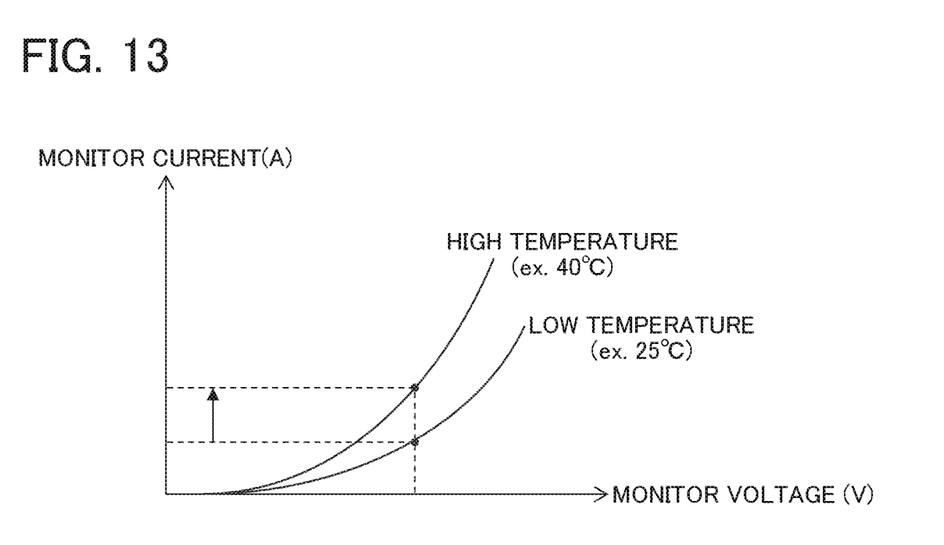
FIG. 13 is a graph showing a relationship between a monitor voltage and a monitor current of a light emitter in the light-emitting display element provided to the display device.

FIG. 13 shows characteristics of a current and a voltage of a drive TFT. In comparison between predetermined monitor voltages, the monitor current increases as the temperature rises. Hence, the problem is, even though the degree of degradation is the same in nature, a degree of seeming degradation is determined low, depending on a difference in temperature.

Figure 14:
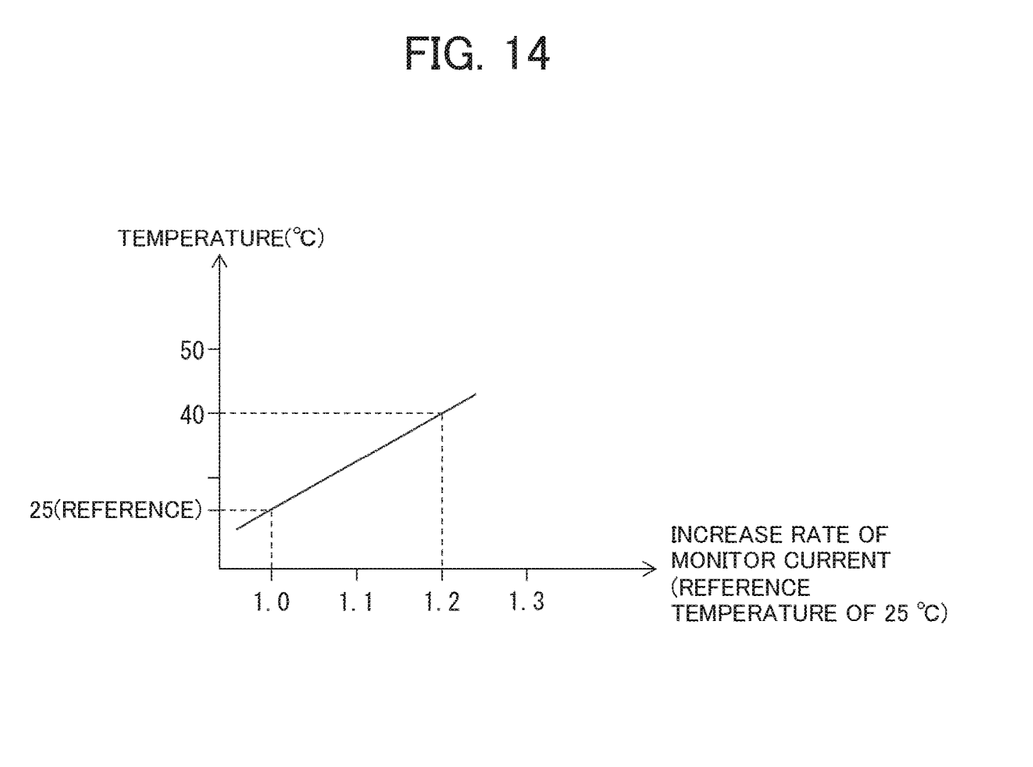
FIG. 14 is a graph showing a relationship between temperature and the above monitor current.

FIG. 14 shows an example of a relationship between temperature and increase rate of a monitor current. In this example, the problem is that at a temperature of 40° C. with respect to a reference temperature of 25° C., the monitor current increases by approximately 1.2 times. Thus, the degradation information is incorrect, and compensation for burn-in deterioration (luminance) is insufficient.

In order to solve this problem, temperature correction is required to the pixel degradation information. If the temperature is lower than the reference temperature, in contrast, the seeming degradation is determined to appear large. Hence, the compensation for the burn-in deterioration (luminance) is excessively performed.

Such a problem does not occur if all the deterioration information on the pixels in the display panel 2 is obtained at the same reference temperature, and if a degree of deterioration and an amount of compensation are calculated on a basis of current values of the pixels. Actually, however, the temperature varies for each of the pixels in the display panel 2 because of various factors (i.e. the displayed content and a configuration of a heat-radiating mechanism).

Thus, a correction is made to a value to be obtained when the current is monitored at the reference temperature. Here, the reference temperature is 25° C.

Now, attention is paid to a pixel. If the temperature of the pixel estimated by the temperature distribution obtaining circuit 4 is 40° C. FIG. 14 shows that the value of the monitor current is 1.2 times larger than the value of the monitor current observed at a temperature of 25° C. Hence, the obtained current monitor value (a value of a current flowing in the pixel when a predetermined voltage is applied) is multiplied by (1/1.2), and corrected to be converted into a current monitor value at the temperature of 25° C. The current monitor values of the other pixels are also corrected in accordance with the temperature distribution information, so that the current monitor values are those at the temperature of 25° C. This correction makes it possible to obtain the values of all the pixels monitored under the same temperature condition of 25° C. That is, the correction can remove progression and regression of the seeming degradation due to the temperature (distribution) in the monitoring. The temperature-monitor current correction can be achieved, using the look-up table (LUT). If the correction can be approximated to, for example, a simple linear relationship, the correction may be calculated with a function expression.

The correcting circuit 5A includes: a degradation information temperature correcting circuit 18 correcting the monitor information on at least one of the light emitter 29 or the drive transistor 30 monitored by the monitor circuit (the read-out transistor 31), and storing the corrected monitor information on a memory 17 for one frame; and a degradation compensating circuit 16 correcting an input image signal to adjust an amount of a current for driving the light-emitting display elements 21. The monitor information is corrected on a basis of the temperature distribution obtained by the temperature distribution obtaining circuit 4. The input image signal is adjusted on a basis of the corrected monitor information stored on the memory 17.

In order to update the pixel degradation information on the whole screen of the display panel, a time is required to display a plurality of frames. Hence, the deterioration information read from the display panel 2 and subjected to temperature correction is saved for one frame on the memory 17.

Third Embodiment

Described below in detail is still another embodiment of the disclosure. For the sake of description, like reference signs designate functionally identical components between this embodiment and the above embodiments. Such components will not be elaborated repeatedly.

Figure 15:
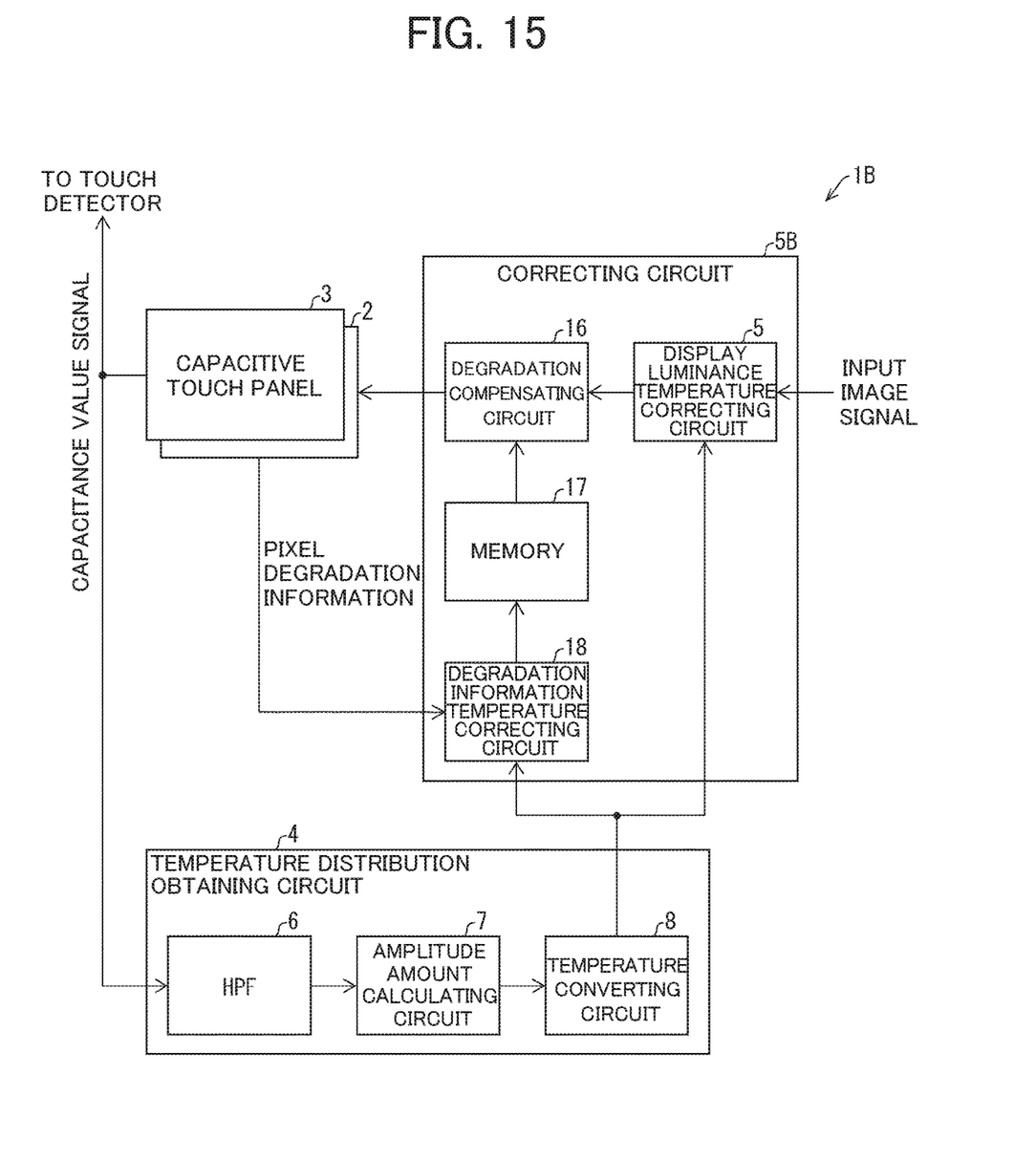
FIG. 15 is a block diagram illustrating a display device according to a third embodiment.

FIG. 15 is a block diagram illustrating a display device 1B according to a third embodiment, showing an exemplary configuration of a system handling both the luminance variation due to temperature described in the first embodiment and the variation in the pixel degradation information described in the second embodiment.

The display device 1B includes a correcting circuit 5B. The correcting circuit 5B includes: a display luminance temperature correcting circuit 5 correcting an input image signal on a basis of temperature distribution, on the surface of the display panel 2, obtained by the temperature distribution obtaining circuit 4; the degradation information temperature correcting circuit 18 correcting monitor information on at least one of the light emitter or the drive transistor monitored by the monitor circuit, and storing the corrected monitor information on the memory 17 for one frame, the monitor information being corrected on a basis of the temperature distribution obtained by the temperature distribution obtaining circuit 4; and the degradation compensating circuit 16 further correcting the input image signal corrected by the display luminance temperature correcting circuit 5 to adjust an amount of a current for driving the light-emitting display elements, and supplying the corrected input image signal to the display panel 2, the amount of the current being adjusted on a basis of the corrected monitor information stored on the memory 17.

Fourth Embodiment

Described below in detail is still another embodiment of the disclosure. For the sake of description, like reference signs designate functionally identical components between this embodiment and the above embodiments. Such components will not be elaborated repeatedly.

Figure 16:
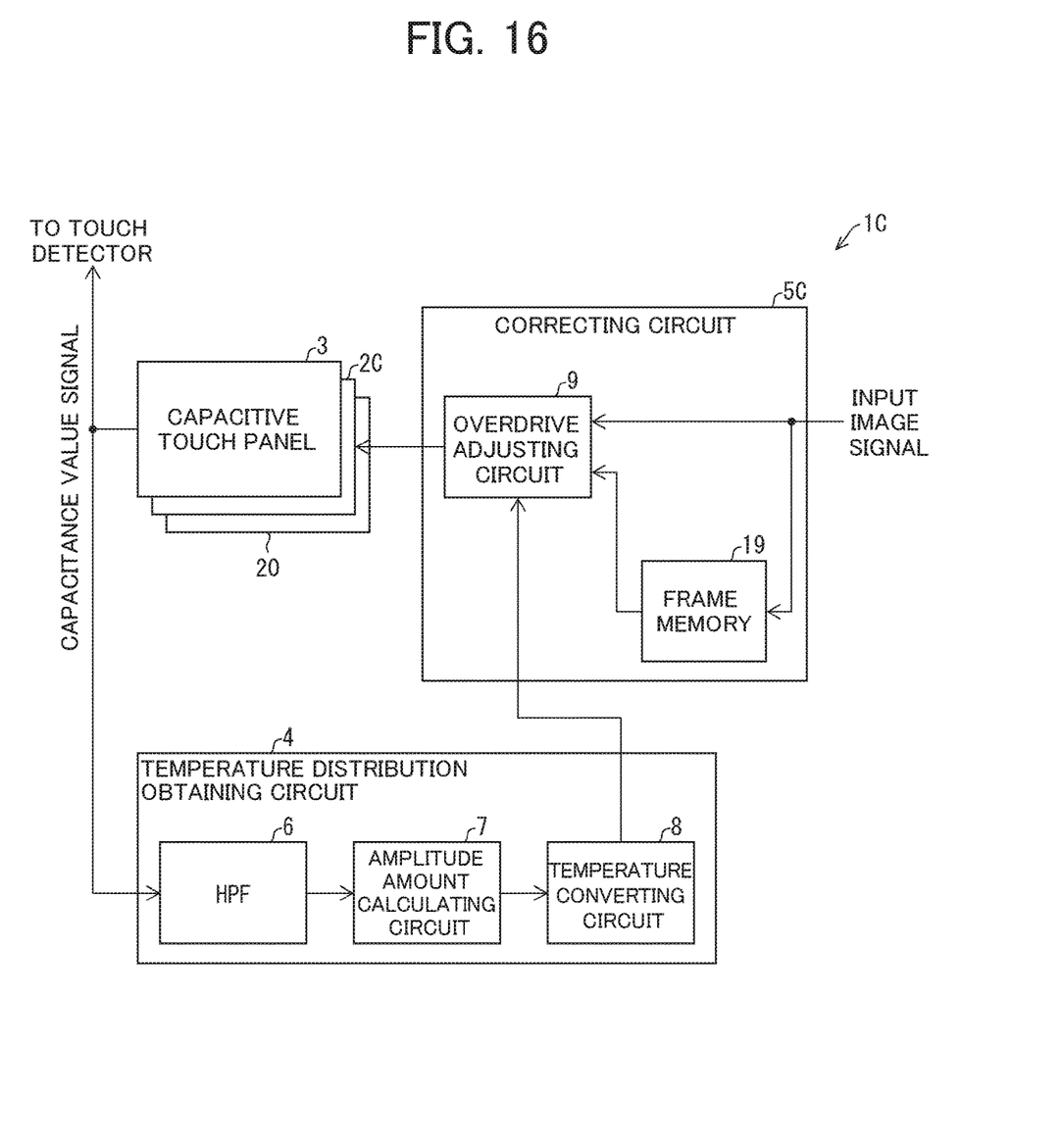
FIG. 16 is a block diagram illustrating a display device according to a fourth embodiment.

FIG. 16 is a block diagram illustrating a display device 1C according to a fourth embodiment. The display device 1C includes: a display panel 2C displaying an image; the capacitive touch panel 3 overlapping a surface of the display panel 2C; and the temperature distribution obtaining circuit 4 obtaining temperature distribution on the surface of the display panel 2C, on a basis of a capacitance value signal to be output from the touch panel 3.

The display panel 2C is a liquid-crystal display panel including a plurality of liquid-crystal display elements. The display panel 2C has a backlight unit 20.

Each of the liquid-crystal display elements is a unit pixel including: transistors for driving and controlling; and a liquid-crystal unit.

The display device 1C further includes: a correcting circuit 5C adjusting overdrive increasing response speed for halftone to be displayed by the liquid-crystal display elements. The overdrive is adjusted on a basis of the temperature distribution, on the surface of the display panel 2C, obtained by the temperature distribution obtaining circuit 4.

The correcting circuit 5C includes: a frame memory 19 storing an input image signal for one frame; and an overdrive adjusting circuit 9 adjusting the overdrive increasing the response speed for the halftone to be displayed by the liquid-crystal display elements The overdrive is adjusted on a basis of: the input image signal; an input image signal of a preceding frame stored on the frame memory 19; and the temperature distribution, on the surface of the display panel 2C, obtained by the temperature distribution obtaining circuit 4.

The liquid-crystal display panel per se does not generate light. However, temperature of the liquid-crystal display panel varies because of heat from the backlight unit 20 serving as a light source and a back face of the liquid-crystal display panel.

In particular, if the backlight unit 20 is a full-array-local-dimming light-emitting-diode (LED) backlight, and utilizes a local dimming scheme that allows the backlight to locally grow in accordance with the displayed content, the liquid-crystal display panel is advantageous in view of contrast and power consumption. However, the problem is, the temperature within the surface of the crustal-display panel is not distributed evenly.

In order to display an image on the liquid-crystal display panel, a voltage is applied to liquid-crystal molecules to change orientations of the molecules and vary a transmittance of light. Here, the response of the liquid-crystal molecules with respect to the applied voltage is as slow as several tens of milliseconds. For a moving image, in particular, the slow response undesirably causes blurring of the image.

Hence, the overdrive is executed on the pixels to obtain a difference in the applied voltage between the frame and the preceding frame for each of the pixels, and intentionally increases variation. However, motion of the liquid-crystal molecules varies depending on temperature, and the liquid-crystal molecules move fast at high temperature and slow at low temperature. To overcome this problem, a known display device includes a temperature sensor to provide temperature information. In accordance with the temperature information, the display device adjusts how well the overdrive works for the whole face of the liquid-crystal panel.

Here, the problems is, if the local dimming scheme is applied to the backlight 20, the temperature within the surface of the liquid-crystal display panel distributes unevenly. Hence, the pixels are overdriven excessively or insufficiently.

In this embodiment, the temperature distribution obtaining circuit 4 obtains the temperature distribution on the surface of the display panel 2C including the liquid-crystal display elements. Such a feature makes it possible to appropriately overdrive each of the pixels.

SUMMARY

The display devices 1, 1A, 1B, and 1C according to a first aspect of the disclosure include: the display panels 2 and 2C displaying an image; the capacitive touch panel 3 overlapping surfaces of the display panels 2 and 2C; the temperature distribution obtaining circuit 4 obtaining temperature distribution on the surfaces of the display panels 2 and 2C, on a basis of a capacitance value signal to be output from the touch panel 3; and the correcting circuits 5, 5A, 5B, and 5C correcting an input image signal corresponding to the image, and supplying the input image signal to the display panels 2 and 2C. The input image signal is corrected on a basis of the temperature distribution, on the surfaces of the display panels 2 and 2C, obtained by the temperature distribution obtaining circuit 4.

Thanks to the above features, the temperature distribution on the surface of the display panel is obtained on a basis of the capacitance value signal to be output from the capacitive touch panel overlapping the surface of the display panel. Such features eliminate the need for separately providing a temperature detecting sensor for performing the correction in accordance with the temperature for each portion of the display panel. The features also eliminate the need for providing two capacitive sensors having different temperature characteristics. As a result, the temperature distribution on the surface of the display panel can be obtained with a simple configuration.

In the display devices 1, 1A and 1B, of a second aspect of the disclosure, according to the first aspect, the display panel 2 preferably includes a plurality of light-emitting display elements. On a basis of the temperature distribution, the correcting circuits 5, 5A, and 5B preferably adjust an amount of a current driving the light-emitting display elements.

The above features can provide a simple configuration to obtain the temperature distribution, on the surface of the display panel, caused by heat generated by the light-emitting elements, and can perform temperature compensation in accordance with the temperature of each portion of the display panel.

In the display devices 1A and 1B, of a third aspect of the disclosure, according to the first or second aspect, the display panel preferably includes a plurality of light-emitting display elements. Each of the light-emitting display elements preferably includes: a light-emitter displaying the image; a drive transistor driving the light-emitter; and a monitor circuit monitoring at least one of the light-emitter or the drive transistor. The correcting circuits 5A and 5B preferably correct monitor information on at least one of the light emitter or the drive transistor monitored by the monitor circuit, and adjust an amount of a current driving the light-emitting display elements. The monitor information is corrected on a basis of the temperature distribution obtained by the temperature distribution obtaining circuit. The amount of the current is adjusted on a basis of the corrected monitor information.

The above features make it possible to perform compensation for the deterioration of each of the pixels on a basis of the temperature distribution on the surface of the display panel, in accordance with the temperature for each portion of the display panel.

In the display device 1C, of a fourth aspect of the disclosure, according to the first aspect, the display panel 2C preferably includes a plurality of liquid-crystal display elements. The correcting circuit 5C preferably adjusts overdrive increasing response speed of the liquid-crystal display elements. The overdrive is adjusted on a basis of the temperature distribution, on the surface of the display panel 2C, obtained by the temperature distribution obtaining circuit 4.

The above features make it possible to solve the problem of excessive and insufficient overdrive caused by uneven temperature distribution on the surface of the display panel including the liquid-crystal display elements, and to perform response speed compensation in accordance with the temperature of each portion of the display panel.

In the display devices 1, 1A. 1B, and 1C of a fifth aspect of the disclosure, according to any one of the first to fourth aspects, the temperature distribution obtaining circuits 4 preferably obtains the temperature distribution, on a basis of a high-frequency component of the capacitance value signal.

The above feature makes it possible to obtain the temperature distribution on the surface of the display panel, in accordance with a noise amplitude component of the capacitance value signal of the touch panel, wherein the noise amplitude component increases at low temperature and decreases at high temperature.

In the display devices 1, 1A, 1B, and 1C of a sixth aspect of the disclosure, according to any one of the first to fourth aspects, the temperature distribution obtaining circuit 4 preferably includes: the high-pass filter 6 allowing a high-frequency component of the capacitance value signal to pass through; an amplitude amount calculating circuit 7 calculating an amount of amplitude of the high-frequency component passing through the high-pass filter 6; and the temperature converting circuit 8 converting, to temperature, the amount of the amplitude of the high-frequency component calculated by the amplitude amount calculating circuit 7.

The above features make it possible to provide a simple configuration to obtain the temperature distribution on the surface of the display panel, in accordance with the capacitance value signal output from the touch panel.

The disclosure shall not be limited to the embodiments described above, and can be modified in various manners within the scope of claims. The technical aspects disclosed in different embodiments are to be appropriately combined together to implement another embodiment. Such an embodiment shall be included within the technical scope of the disclosure. Moreover, the technical aspects disclosed in each embodiment may be combined to achieve a new technical feature.

What is claimed is:

1. A display device, comprising:
a display panel configured to display an image;
a capacitive touch panel overlapping a surface of the display panel;
a temperature distribution obtaining circuit configured to obtain a temperature distribution on the surface of the display panel on a basis of a capacitance value signal to be output from the capacitive touch panel; and
a correcting circuit configured to correct an input image signal corresponding to the image, and supply the input image signal to the display panel, the input image signal being corrected on a basis of the temperature distribution on the surface of the display panel obtained by the temperature distribution obtaining circuit, wherein
the temperature distribution obtaining circuit obtains the temperature distribution on a basis of a high-frequency component of the capacitance value signal.

2. The display device according to claim 1, wherein
the display panel includes a plurality of light-emitting display elements, and
on a basis of the temperature distribution, the correcting circuit adjusts an amount of a current driving the light-emitting display elements.

3. The display device according to claim 1, wherein
the display panel includes a plurality of light-emitting display elements,
each of the light-emitting display elements includes:
a light-emitter configured to display the image;
a drive transistor configured to drive the light-emitter; and
a monitor circuit configured to monitor at least one of the light-emitter or the drive transistor, and
the correcting circuit corrects monitor information on the at least one of the light-emitter or the drive transistor which is monitored by the monitor circuit, and adjusts an amount of a current driving the light-emitting display elements, the monitor information being corrected on a basis of the temperature distribution obtained by the temperature distribution obtaining circuit, and the amount of the current being adjusted on a basis of the corrected monitor information.

4. The display device according to claim 1, wherein
the display panel includes a plurality of liquid-crystal display elements, and
the correcting circuit further adjusts an overdrive for increasing a response speed of the liquid-crystal display elements, the overdrive being adjusted on a basis of the temperature distribution on the surface of the display panel obtained by the temperature distribution obtaining circuit.

5. The display device according to claim 1, wherein
the temperature distribution obtaining circuit includes:
a high-pass filter configured to allow a high-frequency component of the capacitance value signal to pass through;
an amplitude amount calculating circuit configured to calculate an amount of amplitude of the high-frequency component passing through the high-pass filter; and
a temperature converting circuit configured to convert, to a temperature, the amount of the amplitude of the high-frequency component calculated by the amplitude amount calculating circuit.

6. A display device, comprising:
a display panel configured to display an image;
a capacitive touch panel overlapping a surface of the display panel;
a temperature distribution obtaining circuit configured to obtain a temperature distribution on the surface of the display panel on a basis of a capacitance value signal to be output from the capacitive touch panel; and
a correcting circuit configured to correct an input image signal corresponding to the image, and supply the input image signal to the display panel, the input image signal being corrected on a basis of the temperature distribution on the surface of the display panel obtained by the temperature distribution obtaining circuit, wherein
the display panel includes a plurality of liquid-crystal display elements, and the correcting circuit adjusts an overdrive for increasing a response speed of the liquid-crystal display elements, the overdrive being adjusted on a basis of the temperature distribution on the surface of the display panel obtained by the temperature distribution obtaining circuit.

7. A display device, comprising:
a display panel configured to display an image;
a capacitive touch panel overlapping a surface of the display panel;
a temperature distribution obtaining circuit configured to obtain a temperature distribution on the surface of the display panel on a basis of a capacitance value signal to be output from the capacitive touch panel; and
a correcting circuit configured to correct an input image signal corresponding to the image, and supply the input image signal to the display panel, the input image signal being corrected on a basis of the temperature distribution on the surface of the display panel obtained by the temperature distribution obtaining circuit, wherein
the temperature distribution obtaining circuit includes:
a high-pass filter configured to allow a high-frequency component of the capacitance value signal to pass through;
an amplitude amount calculating circuit configured to calculate an amount of amplitude of the high-frequency component passing through the high-pass filter; and
a temperature converting circuit configured to convert, to a temperature, the amount of the amplitude of the high-frequency component calculated by the amplitude amount calculating circuit.

* * * * *